Dec. 30, 1947.     L. H. BROWN     2,433,338
SPLIT FIELD DUAL POWER TELESCOPE
Original Filed June 9, 1944
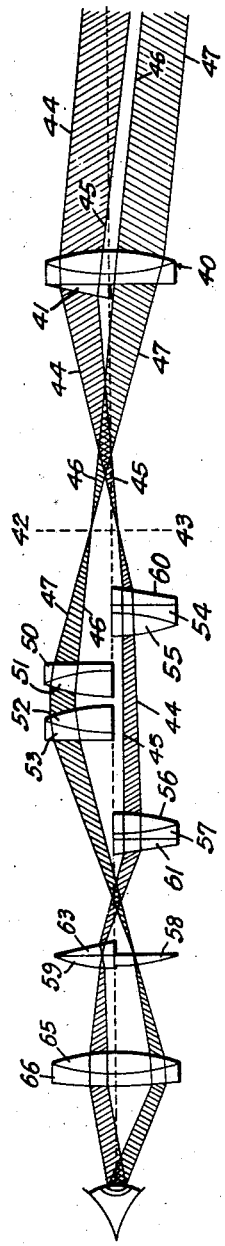
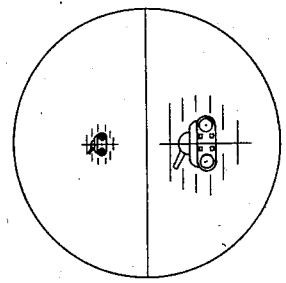
Inventor
Leo H. Brown
By C. E. Herrstrom & H. E. Thibodeau
Attorneys Patented Dec. 30, 1947

2,433,338

UNITED STATES PATENT OFFICE 2,433,338

SPLIT FIELD DUAL POWER TELESCOPE

Leo H. Brown, Glenville, Conn.

Original application June 9, 1944, Serial No. 539,506, now Patent No. 2,388,673, dated November 13, 1945. Divided and this application April 10, 1945, Serial No. 587,599

5 Claims. (Cl. 88—32)

(Granted under the act of March 3, 1883, as amended April 30, 1928; 370 O. G. 757)

The invention described herein may be manufactured and used by or for the Government for governmental purposes without the payment to me of any royalty thereon.

The present invention relates to dual power split field optical systems.

The present application is for subject matter divided out of my copending application Ser. No. 539,506, filed June 9, 1944, now Patent 2,388,673, dated November 13, 1945.

An object of the invention is the provision of a telescope or optical system which enables an object to be viewed under two different magnifications simultaneously with the same eye-piece, the view with one magnification appearing in one part of the field and the view with the other magnification appearing in another part of the field. The field, by which is meant what is seen in the eye-piece of the system, is divided into two parts, one part of which contains the scene under low magnification, and the other part of which contains the scene under a higher magnification. This division occurs preferably along a straight line diametrically across the field, whereby one half of it is under low magnification and the other half of it is under a higher magnification.

It will be understood, of course, that the higher magnification part of the field of view contains less of the actual expanse of the scene or objects viewed with the optical system than the low power part of the field of view, but that those parts of the scene or objects in the high power part of the field appear larger than the same parts of the scene or the same objects appearing in the low power part of the field of view.

The invention is of utility in telescopic sights for guns and in viewing telescopes for general observation.

In the low power part of the field, a gunner or observer can quickly find the target because of the large field of view. This is difficult to accomplish with a high power system, since a high power system includes in its field a comparatively small area of view.

When a reticle in a low power system has been placed upon the image of the target, the same target under higher magnification appears in the high power part of the field. The system or telescope may now be easily moved in elevation or azimuth to place the line of sight, or a reticle in a high power part of the field, upon any desired part of the image of the object in the high power part of the field of view.

Thus, the present optical system renders it comparatively easy to find a target and then to fix a line of sight on a highly magnified image of the target; or to find the target again easily, in case the target moves out of the field of view; or to keep the target in sight, in case the optical system is mounted on a vehicle, such as a combat tank, which by its motion or change of direction of motion would cause the target to move out of the field of view.

An optical system or telescope conforming with the present invention is illustrated in the accompanying drawings, wherein tubes and mountings customarily used for optical elements in telescopic systems are omitted in the interest of simplification of the drawings and since the disclosures of these are unnecessary to the understanding of the invention by persons skilled in the art. Diaphragms used to block-off unwanted rays of light are also omitted for the same reasons.

In the accompanying drawings,

Figure 1 is a longitudinal section of a telescopic system embodying the invention, the section being taken through the optical axis.

Figure 2 is an example of the appearance of the field in the eye-piece of the telescopic system illustrated in Figure 1, showing a combat tank in each part of the divided field under different magnifications.

A converging lens gives a real image of an object when that object lies further from the lens than the focal point of the lens, regardless whether only a part or the whole of the aperture of the lens is used. Thus, if half the area of the lens is covered with an opaque material, the other half will nevertheless give a real image of the object at the same position, and of the same size, as the image formed when using the entire aperture. The present invention is based upon the above scientific fact.

Since objects or scenes viewed by a telescope are at a great distance from the telescope in comparison with the focal length of the objective, the real image formed by the object will lie for all practical purposes in the focal plane of the objective. It will therefore be seen, that the real image at the focal plane can be considered as made up of two images which are exactly superimposed, one of said images arising from one segment or part of the objective on one side of a chord thereof and the other of said images arising from the part or segment of said objective on the other side of said chord. Said chord may be the diameter of the objective, although any chord may be chosen.

The present invention operates upon the bundle of rays of light from each of the said two parts of the objective so as to produce deviation between them, thereby separating the said two superimposed images from each other. After said deviation each of said bundle of rays is operated upon by a converging lens erecting system to form a smaller image of the object from one of them than the image formed from the other of them. In order that these two different sized images may be viewed by a single eye-piece, the converging lens erecting systems referred to are so positioned and dimensioned as to cause the two different sized images to be formed in a common plane. It will be apparent that if a single eye-piece is used to view the two separated images of different size in the said plane, a magnified image of each of them will be obtained, and one of them will appear larger than the other in the eye-piece. Thus, the object may be viewed in the eye-piece under two different degrees of magnification in the same field of view.

The embodiment of the invention illustrated in Figure 1 comprises an achromatic objective lens combination 40 indicated as composed of a converging and a diverging lens. Half of the rear of this objective lens is covered by a deviating prism 41. Parallel rays of light, or rays of light coming from the same point on the object viewed, passing through the part of the objective which is not covered by the deviating prism, as well as like rays of light which pass through the part of the objective that is covered by the prism, are brought to focus at different points in a common plane indicated by the line 42, 43. Were it not for the presence of deviating prism 41, bundle of rays 44—45 and bundle of rays 46—47 would be brought to focus at the same point in plane 42—43, since the two bundles of rays 44—45 and 46—47 are considered as coming from the same point on a distant object. The wedge or prism 41, therefore, effects separation of two images from a single image that would be formed in the absence of prism 41.

To the left of the focal plane 42—43, are two erecting systems each composed of four half lenses as shown. Half lenses 50, 51, 52 and 53 constitute a high power magnifying and erecting system, and half lenses 54, 55, 56, and 57 constitute a lower power magnifying and erecting system. The high power erecting system brings the bundle of light rays 46—47 to focus on the plane surface of plano-convex half lens 58, while the low power erecting system brings the bundle of light rays 44—45 to focus on the plane surface of plano-convex half lens 59. The plane surfaces of plano-convex lenses 58 and 59 lie in the same plane, but the focal lengths of plano-convex lenses 58 and 59 are different and so chosen that the eye-point for bundle of rays 44—45 is the same distance from the eye-piece as the eye-point for bundle of rays 46—47. Deviating wedges or prisms 60 and 61 are placed in the lower power magnifying and erecting system to direct ultimately the bundle of rays 44—45 to deviating wedge or prism 63 cemented over the half lens 59. A suitable reticle is carried on the plane surfaces of lenses 58 and 59.

An eye-piece of any suitable construction may be used in connection with the telescopic system illustrated. The eye-piece or eye lens shown is composed of a converging lens 65 cemented to a diverging lens 66, the glasses of both lenses being chosen with regard to correcting chromatic aberration.

At the plane 42—43, separation of two images of the object is produced. Except for the deviating effect of prism 41, these images would be merged as one image as explained in earlier parts of this description. Bundle of light rays 44—45, and bundle of light rays 46—47, are representative of these two images. The bundle of rays 44—45 proceed from focal plane 42—43 through the low power magnifying and erecting system as shown, and are brought to focus on the plane surface of lens 59 after being deviated by wedge 63. Bundle of rays 46—47 proceed, as shown, from focal plane 42—43 through the high power magnifying and erecting system and are brought to focus on the plane surface of lens 58, as shown in the drawings. The eye-piece then forms real magnified images of the separated images of the same object.

It will, therefore, be seen that two separate images of the same scene or object appear in different magnifications in the same eye-piece. Figure 2 illustrates an example of a divided field obtained according to the present invention. As the field of view is oriented in the drawing, the upper half is a view of the scene or object under low magnification, whereas the lower half of the field of view is a view of the scene or object under a high magnification. The objects illustrated in the two parts of the field are two separate images of the same combat tank. The sighter or gunner finds the target, for example the tank, in the low power part of the field, and then places the reticle lines in the high power part of the field on the desired part of the magnified image of the target in the high power part of the field.

I claim:

1. A telescope comprising an objective, optical wedge means effective over a portion only of said objective to bring the rays passing through said portion to focus at a different point and in the same plane as the point of focus of the light rays operated upon by the remaining part of the objective, whereby two separated real images of the same point of an object are obtained in a first plane; two erecting systems of different magnifying power each positioned to magnify a respective one of said images only and to focus in a second plane differently magnified and separated real images of said first mentioned real images and a single eyepiece in which said images are discrete and of different magnification.

2. In a telescope, an objective, a wedge effective over a portion only of said objective to deviate the light rays passing through said portion to a first point of focus in a first plane, the remaining portion of the objective, focussing light rays passing therethrough, at a second point in said first plane, two erecting systems of different magnifying power, each positioned to erect and magnify at different powers, a respective one of said images, each said system comprising a plurality of segmental lenses, to thereby form in a second plane differently magnified and separated real images of said first mentioned real images, and a single eyepiece in which said images are discrete.

3. An optical system comprising an objective, means in the path of light rays operated upon by part of said objective for deviating said light rays to a different point of focus in a plane than the point of focus in the same plane of the light rays operated upon by the remaining part of the objective, whereby two separated real images of the same point of an object are obtained in a common plane, two erecting systems of different magnifying power which operate respectively on the light rays forming each of said two real images for forming in a common plane differently magnified and separated real images of said first mentioned real images, eye lens means for viewing said differently magnified real images, and means operative between the said erecting systems and the said eye lens means for bringing the rays of light from each of said differently magnified images to substantially the same eye-point.

4. An optical system comprising an objective, a wedge at the rear of part of said objective for deviating light rays passing through said part of the objective to a different point of focus in a plane than the point of focus in the same plane of the light rays operated upon by the remaining part of the objective, whereby two separated real images of the same point of an object are obtained in a common plane, two erecting systems of different magnifying power which operate respectively on the light rays forming each of said two real images for forming in a common plane differently magnified and separated real images of said first mentioned real images, said erecting systems each comprising a plurality of segmental lenses; eye lens means for viewing said differently magnified real images, and lens and wedge means operative between the said erecting systems and the said eye lens means for bringing the rays of light from each of said differently magnified images to substantially the same eye-point.

5. In a telescope, an objective, a deviating prism positioned closely adjacent and extending over a portion only of said objective to focus at a first point in a plane, the rays proceeding through said portion from a remote field of view, the remaining portion of said objective acting to focus the rays passing therethrough at a second point in said plane spaced from said first point, whereby to obtain two separated images of the same portion of said field of view, and two separate erecting systems of different magnifying power each arranged to receive and magnify the rays focused at said first and second points, respectively, and to focus in a common plane, discrete, differently magnified images of the said portion of the field of view.

LEO H. BROWN.

REFERENCES CITED

The following references are of record in the file of this patent:

UNITED STATES PATENTS

| Number | Name | Date |
|---|---|---|
| 578,459 | Leuner | Mar. 9, 1897 |
| 828,511 | Saegmuller | Aug. 14, 1906 |
| 1,290,777 | O'Brien | Jan. 7, 1919 |
| 1,351,430 | Luboshey | Aug. 31, 1920 |
| 1,482,069 | Douglass | Jan. 29, 1924 |
| 1,873,302 | Francisco | Aug. 23, 1932 |
| 2,387,838 | French | Oct. 30, 1945 |

FOREIGN PATENTS

| Number | Country | Date |
|---|---|---|
| 25,844 | Great Britain | Nov. 20, 1911 |
| 167,443 | Great Britain | Nov. 24, 1921 |